United States Patent [19]
Box

[11] Patent Number: 5,293,823
[45] Date of Patent: Mar. 15, 1994

[54] ROBOTIC VEHICLE

[76] Inventor: W. Donald Box, 115 Newhaven Rd., Oak Ridge, Tenn. 37830

[21] Appl. No.: 949,898

[22] Filed: Sep. 23, 1992

[51] Int. Cl.$^5$ .............................................. B61B 13/00
[52] U.S. Cl. ................................................. 104/138.2
[58] Field of Search ..................... 104/138.2; 358/100; 378/60; 346/33 P

[56] References Cited

U.S. PATENT DOCUMENTS

| | | | |
|---|---|---|---|
| 4,522,129 | 6/1985 | Jerberyd | 104/138.2 |
| 5,018,451 | 5/1991 | Hapstack | 104/138.2 |
| 5,080,020 | 1/1992 | Negishi | 104/138.2 |
| 5,121,694 | 6/1992 | Zollinger | 104/138.2 |

FOREIGN PATENT DOCUMENTS

| | | | |
|---|---|---|---|
| 2557055 | 6/1985 | France | 104/138.2 |
| 0186462 | 7/1989 | Japan | 104/138.2 |
| 0060875 | 3/1990 | Japan | 104/138.2 |
| 0025067 | 2/1991 | Japan | 104/138.2 |
| 0032976 | 2/1991 | Japan | 104/138.2 |
| 0045464 | 2/1991 | Japan | 104/138.2 |
| 0086679 | 4/1991 | Japan | 104/138.2 |
| 0167066 | 7/1991 | Japan | 104/138.2 |
| 0208765 | 9/1991 | Japan | 104/138.2 |
| 0042565 | 1/1992 | Japan | 104/138.2 |

Primary Examiner—Mark T. Le
Attorney, Agent, or Firm—Pitts & Brittian

[57] ABSTRACT

A robotic vehicle (10) for travel through an enclosed or partially enclosed conduit or pipe including vertical and/or horizontal conduit or pipe. The robotic vehicle (10) comprises forward and rear housings (32 and 12) each provided with a surface engaging mechanism for selectively engaging the walls of the conduit through which the vehicle is travelling, whereby the housings (32 and 12) are selectively held in a stationary position within the conduit. The vehicle (10) also includes at least three selectively extendable members (46), each of which defines a cavity (56) therein. The forward end portion (50) of each extendable member (46) is secured to the forward housing (32) and the rear end portion (48) of each housing is secured to the rear housing (12). Each of the extendable members (46) is independently extendable from a retracted position to an extended position upon the injection of a gas under pressure into the cavity (56) of the extendable member such that the distance between the forward housing (32) and the rear housing (12) can be selectively increased. Further, each of the extendable members (46) is independently retractable from the extended position to the retracted position upon the application of a vacuum to the cavity (56) of the extendable member (46) such that the distance between the forward housing (32) and the rear housing (12) can be selectively decreased.

23 Claims, 7 Drawing Sheets

ROBOTIC VEHICLE

DESCRIPTION

This invention was made with Government support under contract DE-AC05-84OR21400 awarded by the U.S. Department of Energy to Martin Marietta Energy Systems, Inc. and the Government has certain rights in this invention.

TECHNICAL FIELD

This invention relates to a robotic vehicle for carrying monitoring devices, tools and other items, and which is suitable for remotely controlled travel through tunnels, ducts, pipes and the like. In this particular invention the robotic vehicle includes forward and rear housings, each provided with surface engaging means, and a plurality of extendable members positioned therebetween.

BACKGROUND ART

The use of robotic vehicles has become prevalent in many industries in recent years. Such vehicles are commonly used for carrying monitoring devices, tools or other items, and can travel into hazardous or confined areas where human workers cannot or should not go. However, devising robotic vehicles capable of travelling through, and efficient operation in, enclosed and/or confined spaces such as within a system of pipes, ducts or other conduits, has presented difficulties.

Various robotic devices have heretofore been designed in an effort to solve problems relating to efficient travel and operation within a confined space or travelway. For example, various robotic devices are disclosed in U.S. Pat. Nos. 3,036,530; 4,770,105; 4,848,168; 4,862,808; 4,938,081; 4,953,412; and 5,018,451. A robotic device is also disclosed in an article entitled *Mechanical Caterpillar*, POPULAR MECHANICS, June 1992, Vol. 169, No. 6. However, such devices tend to either lack the mobility or maneuverability for efficient operation or they include highly complex mechanisms for achieve mobility and maneuverability which make the devices expensive and difficult to operate and maintain. In this regard, for travel within a system of pipes or ducts efficient operation requires that the robotic vehicle be capable of controlled, small radius turns such that the vehicle can move between pipes or ducts which may intersect at various angles. Moreover, a mechanical breakdown of the robotic vehicle within a pipe or conduit system can result in great cost and inconvenience. Thus, mechanical complexity, with the attendant risk of a malfunction, is an unacceptable tradeoff for achieving mobility and maneuverability.

Therefore, it is an object of the present invention to provide a robotic vehicle capable of travel through an enclosed or partially enclosed including vertical and/or horizontal conduit or pipe.

It is another object of the present invention to provide a robotic vehicle capable of transporting various monitoring devices, such as, for example, video cameras, pH and pOH electrodes, oxygen content monitors, conductivity probes, radioactivity monitors, fiber optics, etc., into an enclosed or partially enclosed conduit or pipe.

Yet another object of the present invention is to provide robotic vehicle which is capable of transporting various tools through a conduit or pipe, such as, for example, scrubbing or liquid spraying tools for cleaning the conduit, grasping devices or scoops for retrieving objects or taking samples from within the conduit, and various other remotely controlled devices.

Still another object of the present invention is to provide a robotic vehicle which is sufficiently maneuverable to travel between intersecting conduits and otherwise suitable for travel through complex conduit systems.

A further object of the present invention is to provide a robotic vehicle which offers reliable operation, and which is inexpensive to manufacture and maintain.

DISCLOSURE OF THE INVENTION

Other objects and advantages will be accomplished by the present invention which provides a robotic vehicle for travel through an enclosed or partially enclosed conduit or pipe including vertical and/or horizontal conduit or pipe. The robotic vehicle comprises forward and rear housings, each provided with surface engaging means for selectively engaging the walls of the conduit through which the vehicle is travelling so as to selectively hold the housing in a stationary position within the conduit. The vehicle also includes at least three selectively extendable members, each of which defines a cavity therein. The forward end portion of each extendable member is secured to the forward housing and the rear end portion of each extendable member is secured to the rear housing.

Each of the extendable members is independently extendable from a retracted position to an extended position upon the injection of a gas under pressure into the cavity of the extendable member such that the distance between the forward housing and the rear housing can be selectively increased. Further, each of the extendable members is independently retractable from the extended position to the retracted position upon the application of a vacuum to the cavity of the extendable member such that the distance between the forward housing and the rear housing can be selectively decreased. Accordingly, travel of the robotic vehicle can be accomplished by alternately securing the position of either the forward or rear housing within the conduit using the surface engaging means, while disengaging the other housing so as to allow it to move within the conduit, and selectively extending or retracting the extendable members so as to effect movement of the housing which is disengaged from the surface of the conduit.

BRIEF DESCRIPTION OF THE DRAWINGS

The above mentioned features of the invention will be more clearly understood from the following detailed description of the invention read together with the drawings in which.

BEST MODE FOR CARRYING OUT THE INVENTION

A robotic vehicle incorporating various features of the present invention is illustrated generally at 10 in the FIGS. 1 through 5. The robotic vehicle 10 comprises a rear housing 12 provided with surface engaging means 25 for selectively engaging the interior walls 14 of a pipe or conduit so as to selectively maintain the housing 12 in a stationary position within such pipe or conduit. In the illustrated embodiment of FIGS. 1 through 5 the surface engaging means includes an inflatable bladder 16 which circumscribes the housing 12 and which can be selectively inflated to engage the walls 14 of the conduit and selectively deflated to allow movement of the housing 12 through the conduit.

More specifically, in the preferred illustrated embodiment the rear housing 12 defines a centrally disposed hub portion 18 and an annular outer rim 20, the outer rim 20 being provided with a circumscribing recess 22. A substantially fluid impervious rubber or elastomeric covering sheet 24 is secured over the recess 22 such that a cavity 26 is cooperatively formed by the housing 12 and the covering sheet 24. Further, at least one fluid access port 28, accessing the cavity 26, is provided in the rim 20 to facilitate the selective inflation and evacuation of the bladder 16.

It will be appreciated that the illustrated bladder 16 is only one possible bladder means which can be utilized. For example, a tubular bladder such as the bladder 30 illustrated in FIG. 6 can be used if desired. Further, whereas FIGS. 1 through 6 illustrate bladders 16 and 30 which circumscribe the housing 12 (and the housing 32 described hereinafter), it will be understood that a plurality of selectively spaced inflatable bladders, or, as will be discussed below, a plurality of pneumatic actuators or pistons, can be used if desired.

The robotic vehicle 10 also includes a forward housing 32 provided with surface engaging means for selectively engaging the walls 14 of the pipe or conduit so as to selectively maintain the housing 32 in a stationary position within such pipe or conduit. As in the case of the illustrated housing 12, the surface engaging means of the forward housing 32 includes an inflatable bladder 34 which circumscribes the housing 32 and which can be selectively inflated to engage the walls 14 of the conduit. Also, the forward housing 32 defines a centrally disposed hub portion 36 and an annular outer rim 38, the outer rim 38 being provided with a circumscribing recess 40. A substantially fluid impervious rubber or elastomeric covering sheet 42 is secured over the recess 40 such that a cavity 44 is cooperatively formed by the housing 32 and the covering sheet 42. Further, at least one fluid access port 45, accessing the cavity 44, is provided in the rim 38 to facilitate the selective inflation and evacuation of the bladder 34.

It will also be noted that the housings 12 and 32 can be provided with wheel members 47 which extend radially beyond the outer rims 20 and 38 to facilitate movement of the housings 12 and 32 through a conduit when the associated bladder 16 or 34 is not inflated and engaging the walls of the conduit. Alternatively, the housings 12 and 32 can be provided with skid members which facilitate the movement of the housings past irregularities in the walls 14 of a conduit such as the pivotally mounted skid members 49 illustrated in FIG. 6.

The robotic device 10 further comprises at least three extendable members which are secured between the rear housing 12 and the forward housing 32, and which serve to selectively move the housings 12 and 34 toward or away from one another to effect movement of the robotic vehicle 10. In the preferred illustrated embodiment of FIGS. 1 through 5, the extendable members define tubular bellows members 46, each of the bellows members 46 having a first end portion 48 secured to the housing 12 and a second, opposite end portion 50 secured to the housing 32.

More specifically, in the preferred illustrated embodiment the housing members 12 and 32 are provided with mounting collars 52 which are received in openings 54 defined in the end portions 48 and 50 of the bellows members 46, with suitable clamp means being used to secure the end portions 48 and 50 on their respective collars 52. Thusly secured, a cavity 56 is defined within each of the bellows members 46, with fluid access to each of the cavity being provided through at least one access port 58, which in the preferred embodiment of the robotic vehicle 10 is disposed in the housing 32.

The bellows members 46 are preferably fabricated of a rubber or elastomeric material such that they not only extend axially upon injection of fluid under pressure into the cavities 56 and retract axially upon application of a vacuum to the cavities 56, but also are laterally flexible to allow the bellows members to bend as the robotic vehicle 10 travels through bends and corners in a conduit. In this regard, one suitable fabricating material is corrugated rubber tubing, but it is contemplated that various flexible materials could be used.

The cavities 26 and 44 of the housings 12 and 32, respectively, and the cavities 56 of the bellows members 46 are connected to a suitable source of pressurized gas, and to a suitable vacuum source, by a flexible umbilical cable 60. In the preferred illustrated embodiment the cable 60 defines and outboard end portion 62 which is received in an opening 64 provided in the hub portion 36 of the housing 32 and extends rearwardly, through an opening 66 provided in the hub portion 18 of the housing 12, to be connected to the pressurized gas source and vacuum source.

The umbilical cable 60 carries a plurality of pneumatic lines for establishing fluid communications between the cavities 26, 44 and 56 and the pressurized gas source and vacuum source. As is best illustrated in the schematic illustration of FIG. 5. The cavity 26 of the bladder 16 is connected via pneumatic line 68 to a two-way valve 70, with the valve 70 being connected via pneumatic lines 72 and 74 to a source of pressurized gas 76 and a vacuum source 78, respectively. Similarly, the cavity 44 of the bladder 34 is connected via pneumatic line 80 to a two-way valve 82, with the valve 82 being connected via pneumatic lines 84 and 86 to the source of pressurized gas 76 and the vacuum source 78, respectively. Thus, by selective manipulation of the valves 70 and 82, the bladders 16 and 34 can be selectively injected with pressurized gas so as to expand such bladders, or evacuated to contract the bladders.

Figure 5:
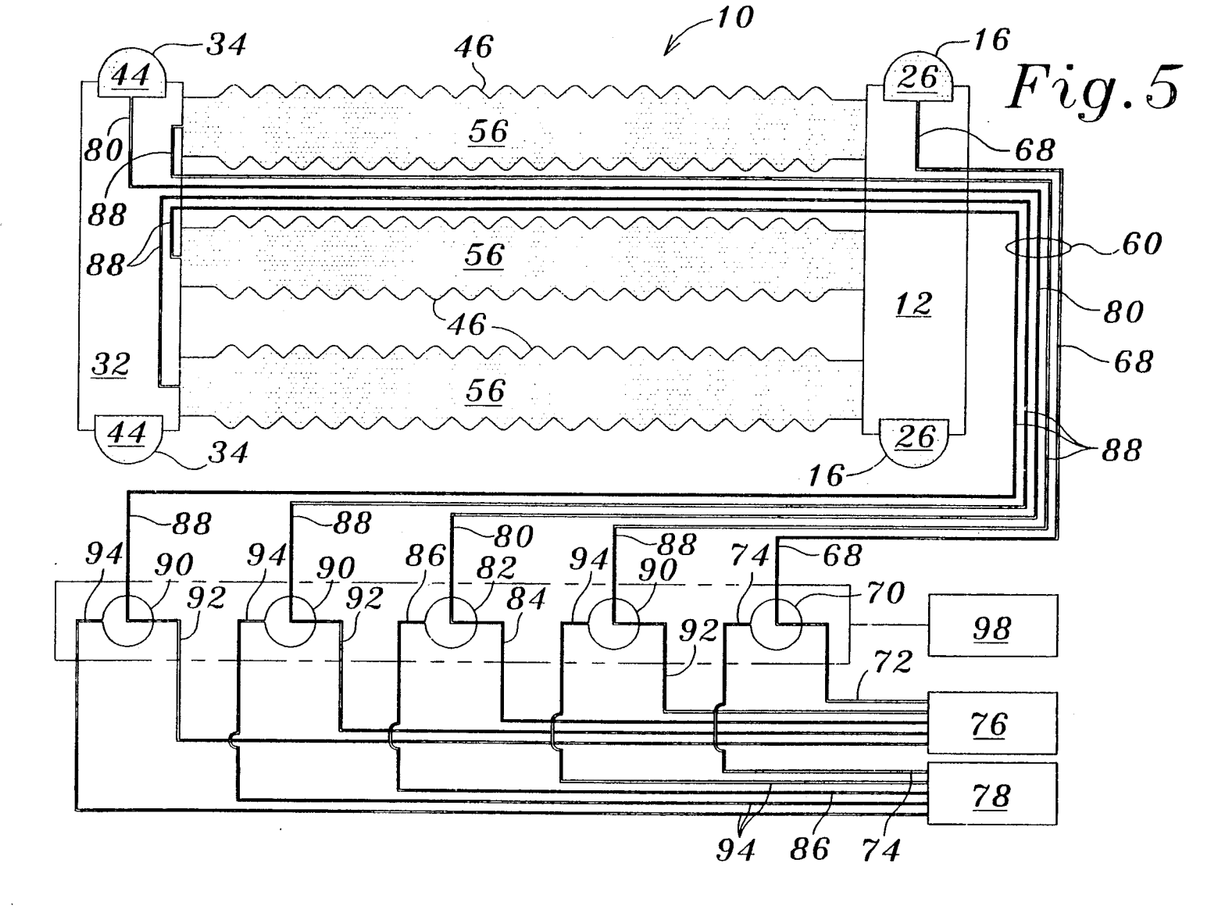
FIG. 5 illustrates a schematic diagram of the pneumatic system of a robotic vehicle of the present invention.
Figure 6:
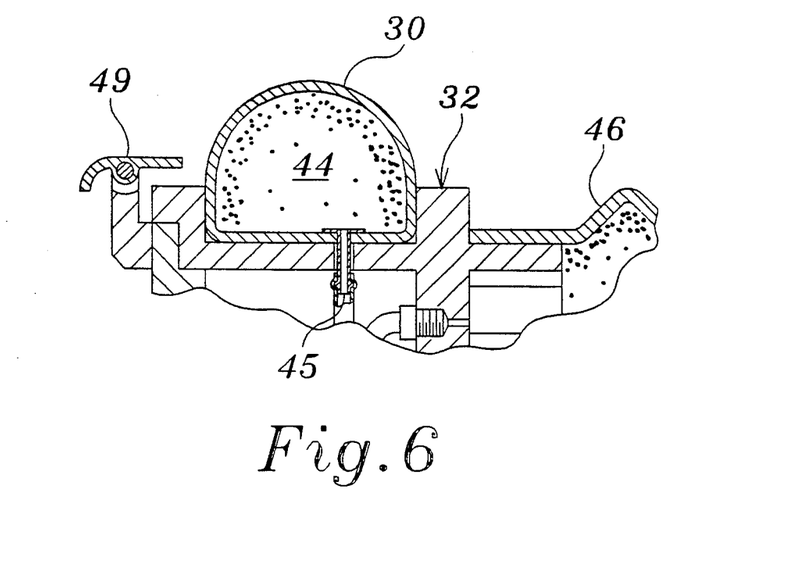
FIG. 6 illustrates a partial side elevation view, in section, of an alternate embodiment of the robotic vehicle of the present invention.

The cavities 56 of the bellows members 46 are each connected via a pneumatic line 88 to a two-way valve 90, with each of the valves 90 being connected via pneumatic lines 92 and 94 to the source of pressurized gas 76 and a vacuum source 78, respectively. Accordingly, by selectively manipulating the valves 90, the bellows members 46 can be selectively filled with pressurized gas to move such bellows members to an extended position, or evacuated so as to move the bellows members to a retracted position.

In order to effect forward travel of the robotic vehicle 10 through a conduit a gas is injected into the bladder 16 of the rear housing 12 such that the bladder 16 expands to engage the walls 14 of the conduit, and a vacuum is applied to the bladder 34 of the forward housing 32 such that the bladder 34 is deflated and the housing 32 is free to move within the conduit. With the rear housing held in place within the conduit by the inflated bladder 16, and with the bladder 34 deflated to allow movement of the forward housing 32, gas is injected into one or more of the cavities 56 of the bellows members 46, thereby causing such bellows members 46 to expand axially and move the housing 32 away from the housing 12. After the bellows members 46 have been selectively extended, gas is injected into the bladder 34 of the forward housing 32 such that the bladder 34 expands to engage the walls 14 of the conduit, and a vacuum is applied to the bladder 16 of the rear housing 12 such that the bladder 16 is deflated and the housing 12 is free to move within the conduit. With the forward housing held in place within the conduit by the inflated bladder 34, and with the bladder 16 deflated to allow movement of the rear housing 12, a vacuum is applied to the cavities 56 of the bellows members 46, thereby causing the bellows members 46 to contract axially and move the housing 12 toward the housing 32.

Of course, it will be understood that forward travel is perpetuated by repetition of the above-outlined sequence. Further, it will be recognized that by reversing the sequence, i.e. such that the bellows members 46 are axially expanded as the bladder 34 of the housing 32 is expanded and the bladder 16 of the housing 12 is evacuate, etc., rearward travel of the robotic vehicle 10 can be effected.

Figure 1:
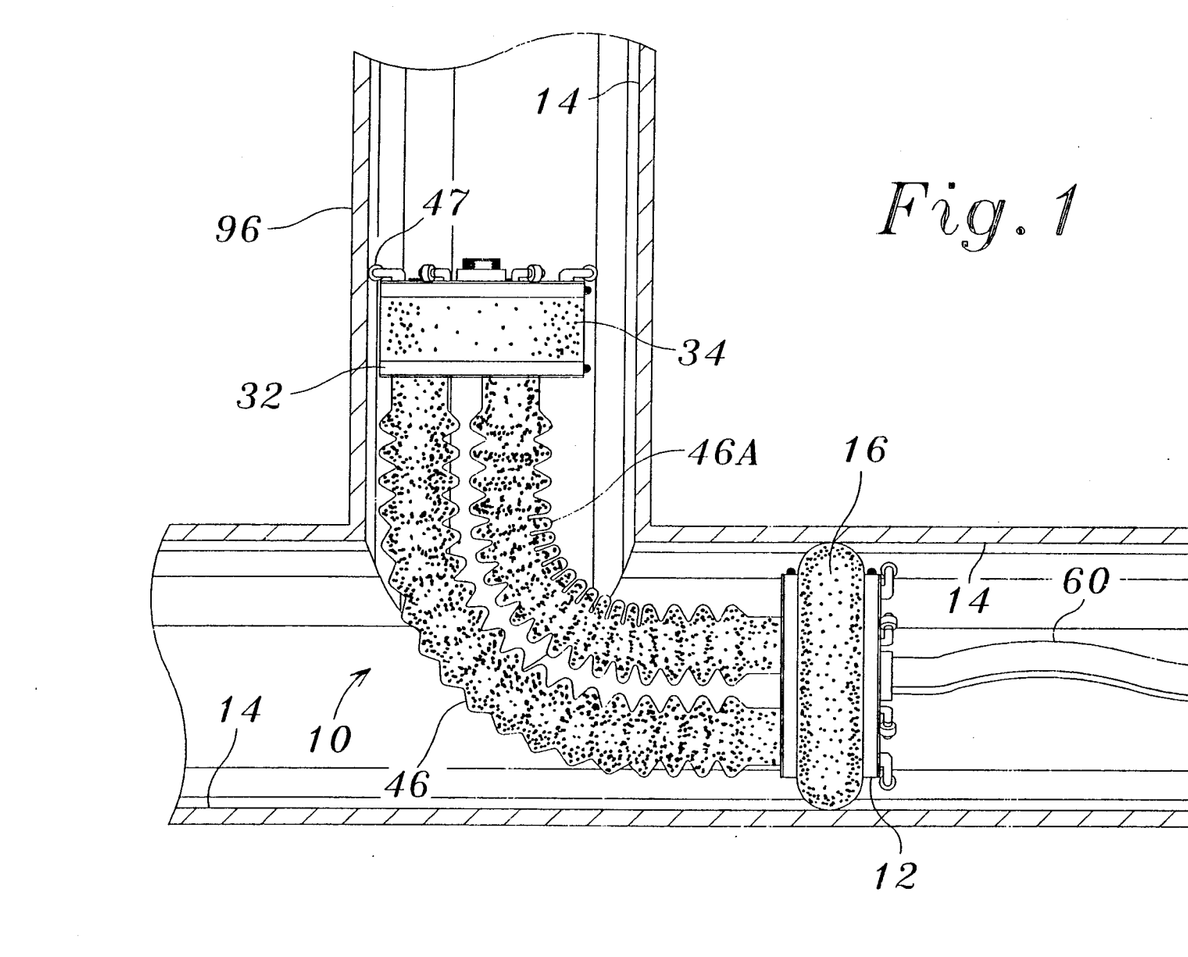
FIG. 1 illustrates a side elevation view of a robotic vehicle of the present invention as it is positioned in a conduit.
Figure 2:
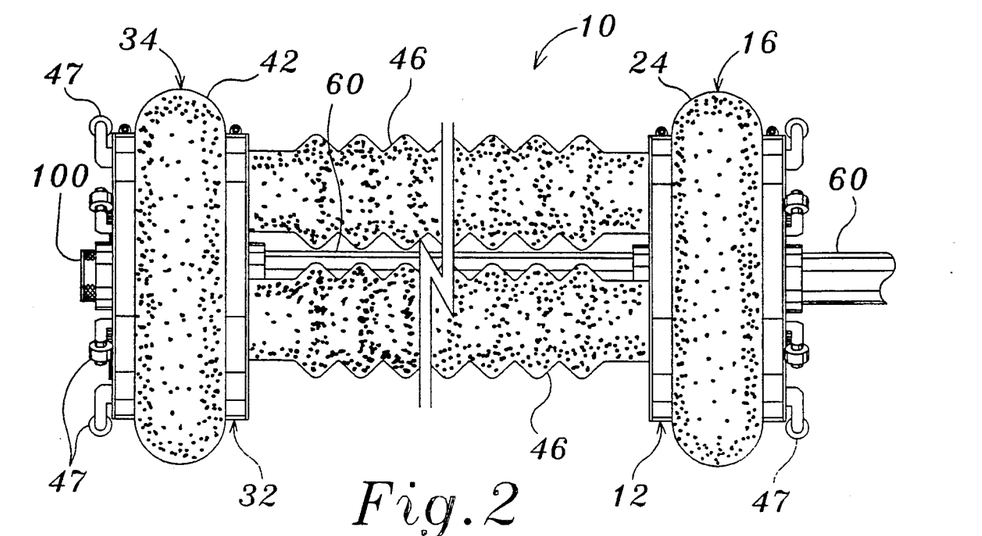
FIG. 2 illustrates a side elevation view of a robotic vehicle of the present invention.
Figure 3:
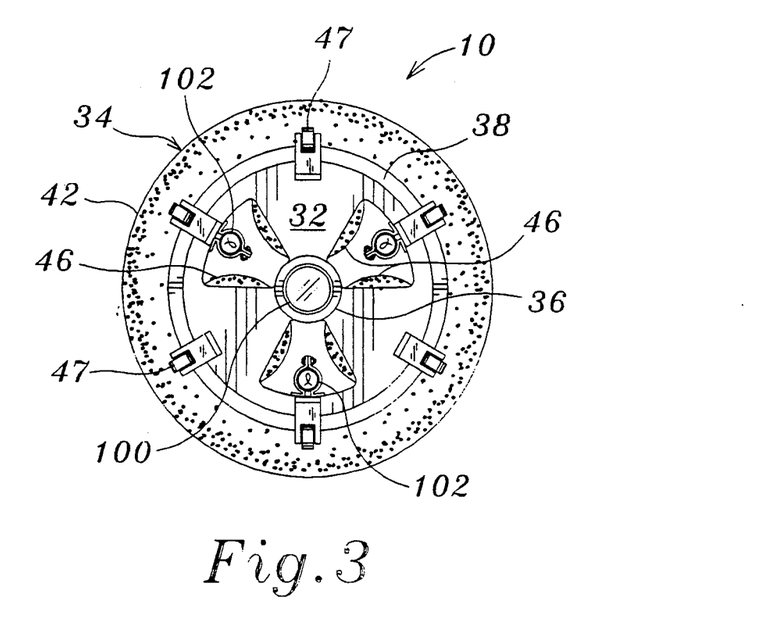
FIG. 3 illustrates a front elevation view of a robotic vehicle of the present invention.
Figure 4:
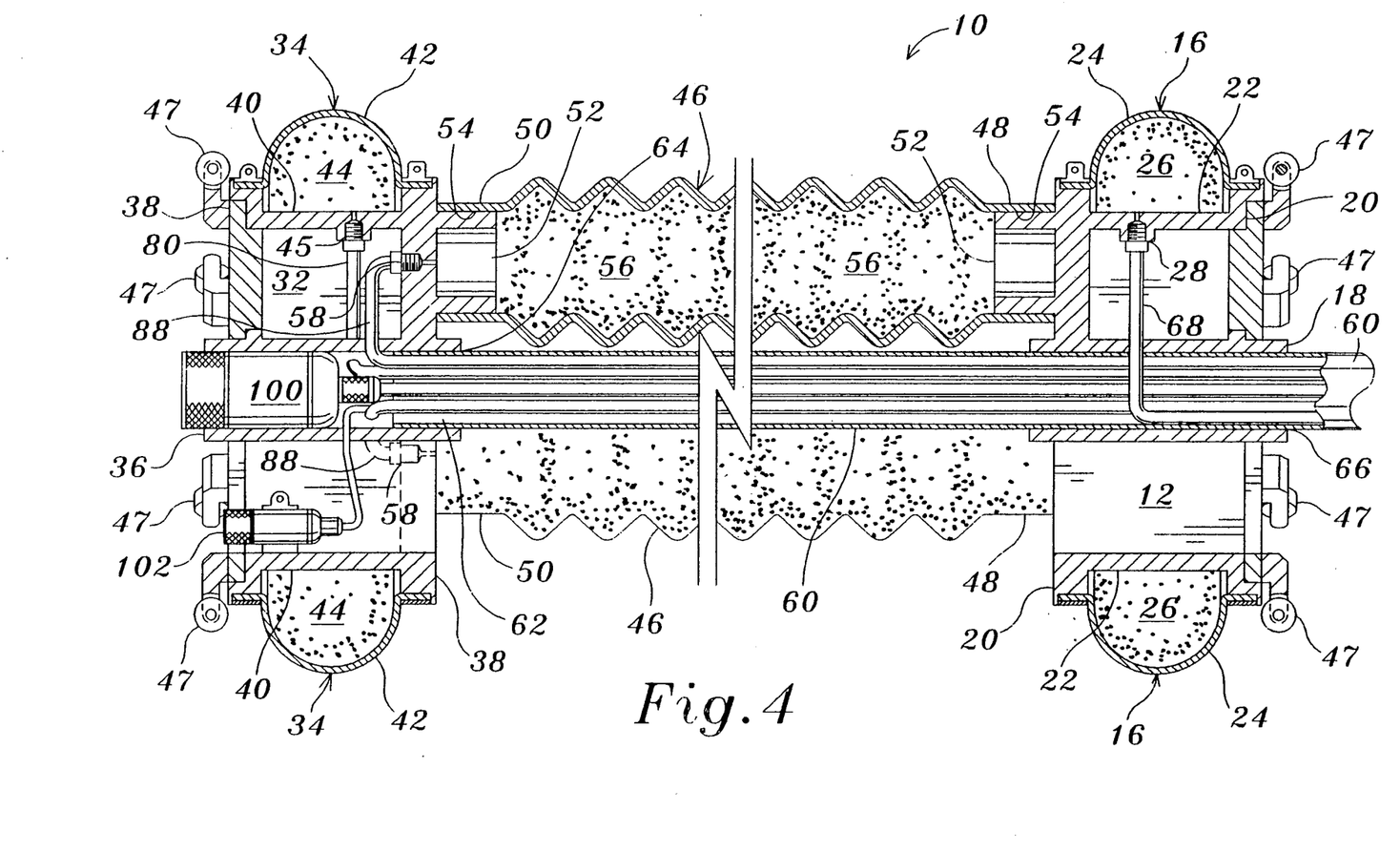
FIG. 4 illustrates a side elevation view, in section, of a robotic vehicle of the present invention.

As is best illustrated in FIG. 1, the providing of the vehicle 10 with at least three bellows members 46 allows the robotic vehicle 10 to execute turns which allow it to readily navigate extreme bends in a conduit or to be maneuvered into intersecting conduits. In this regard, by applying a vacuum to at least one of the bellows members 46, while at the same time injecting the remaining bellows member or members 46 with pressurized gas, or by selectively varying the extent to which the certain bellows members 46 are extended relative to the other bellows members 46, the angular direction of travel can be altered.

For example, in FIG. 1 a vacuum has been applied to the cavity 56 of the bellows member 46A as pressurized gas is injected into the cavities 56 of the other bellows members 46, thus raising the forward housing 32 into the intersecting conduit 96. After the housing 32 has been maneuvered into the intersecting conduit 96, pressurized gas is injected into the cavity 44 such that the housing 32 is held in position within the conduit 96. A vacuum is then applied to the cavity 26 of the housing 12 and the cavities 56 of the bellows members such that the housing 12 is drawn into the intersecting conduit 96.

Thus, it will be appreciated by those skilled in the art that the robotic vehicle 10 is capable of small radius turns in any radial direction. Moreover, manipulation of the bellows members 46 with the alternating injection of gas into the cavities 56 and evacuation of such cavities provides great control over movement of the housings 12 and 32 such that the robotic vehicle 10 can be readily maneuvered from one conduit into an intersecting conduit. In this regard, it will be noted that the actuation of the valves 70, 82 and 90 is preferably controlled by a computer 98 (see FIG. 5). This allows the travel of the robotic device 10 to be controlled by a conventional computer control device such and a "joy stick" or "mouse" (not shown).

It will be recognized that the robotic vehicle 10 is capable of transporting various monitoring devices or other items into a conduit. In this regard, vehicle 10 can be used to carry monitoring devices such as pH and pOH electrodes, oxygen content monitors, conductivity probes, radioactivity monitors, fiber optics, etc. For example, the illustrated robotic vehicle 10 carries a television camera 100 mounted in the opening 64 of the forward housing 32 such that the interior of a conduit can be examined by the operator of the vehicle 10. To facilitate the viewing of the interior of the conduit, lights 102 can be mounted on the housing 32 to illuminate the area in front of the vehicle 10. Of course, the umbilical cable 60 serves to carry any circuitry required for operation of the camera 100 or the lights 102.

It will also be appreciated by those skilled in the art that various tools can be carried by the robotic vehicle 10. For example, scrubbing devices for cleaning the conduit, grasping devices or scoops for retrieving objects or taking samples from within the conduit, and various other remotely controlled tools can be mounted on the housings 32 and/or 12 of the robotic vehicle 10.

Figure 7:
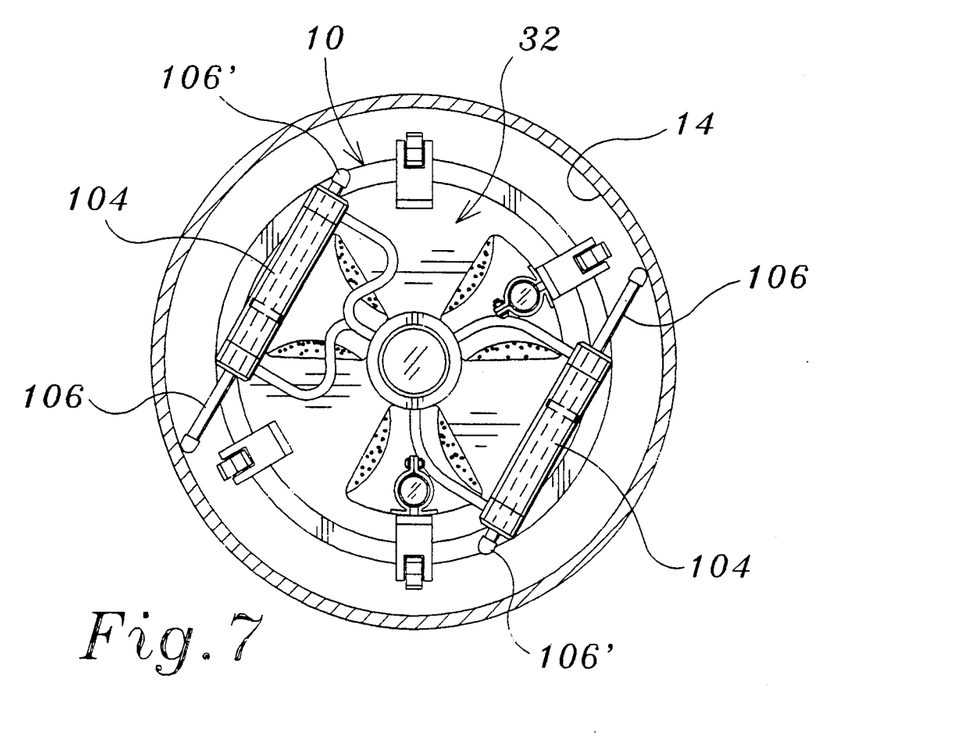
FIG. 7 illustrates a front elevation view of another alternate embodiment of the robotic vehicle of the present invention.

Depending upon the nature of the monitoring device or tool mounted on the vehicle 10, it can be useful to have the ability to rotate the housings 12 and/or 32 within the conduit in which it is traveling. Thus, in one preferred embodiment the housings 32 (and/or 12) is provided with means for effecting such rotation. For example, as illustrated in FIG. 7 the housing 32 can be provided with one or more pneumatic actuators 104 each having oppositely disposed actuator arms 106 and 106', which can be reciprocated to selectively engage the walls 14 of the conduit. It will be noted that the actuators 104 are positioned such that the actuator arms 106 and 106' reciprocate on an axis forming an acute angle to a line tangent to the arcuate wall 14 of the conduit at the point of contact of the actuator arms with the wall 14. It will be appreciated that with this disposition of the actuators 104, reciprocation of the actuator arms 106 and 106' to selectively engage the wall 14 effects rotation of the housing 32 within the conduit. It will also be appreciated that by selectively using the arms 106 or 106' the direction of rotation desired can be selected.

Figure 8:
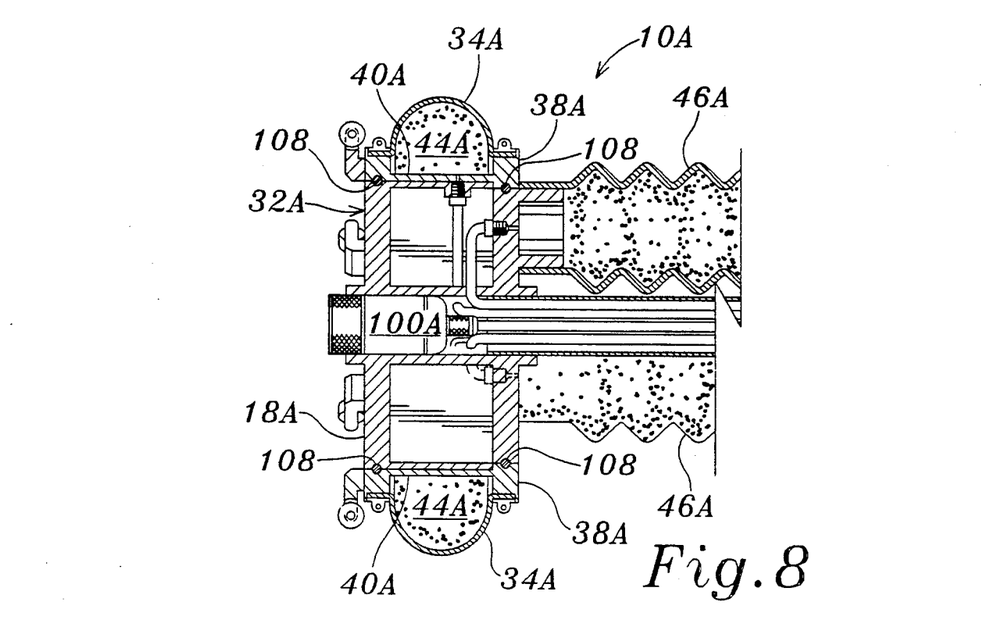
FIG. 8 illustrates a partial side elevation view, in section, of a further alternate embodiment of the robotic vehicle of the present invention.

In FIG. 8 an alternate embodiment of the forward housing of the robotic vehicle of the present invention is illustrated at 32A. Whereas, FIG. 8 illustrates only the alternate construction of the forward housing 32A of the vehicle, it will be understood that the rear housing can utilize a similar alternate construction. Further, for convenience, features of the robotic vehicle 10A which are common to the previously described robotic vehicle 10 are referenced in FIG. 8 with common numerals followed by the alphabetic character "A".

As illustrated, the forward housings 32A of the robotic vehicle 10A is provided with removable outer rims 38A. More specifically, the outer rim 38A is received about the inner portion 18A of the housing 32A and defines the recess 40A of such housings. It will also be noted that O-ring seals 108 can be provided between the outer rim 38A and the inner portion 18A of the housing 32A to insure the fluidtight integrity of the cavity 44A.

Of course, the removability of the outer rim 38A allows outer rims defining different diameters or geometric configurations to be interchangeably used depending upon the size and configuration of the conduit in which the robotic vehicle 10A is to be used. Moreover, it allows damaged or worn outer rims 38A to be replaced without replacement of the entire housing.

Figure 9:
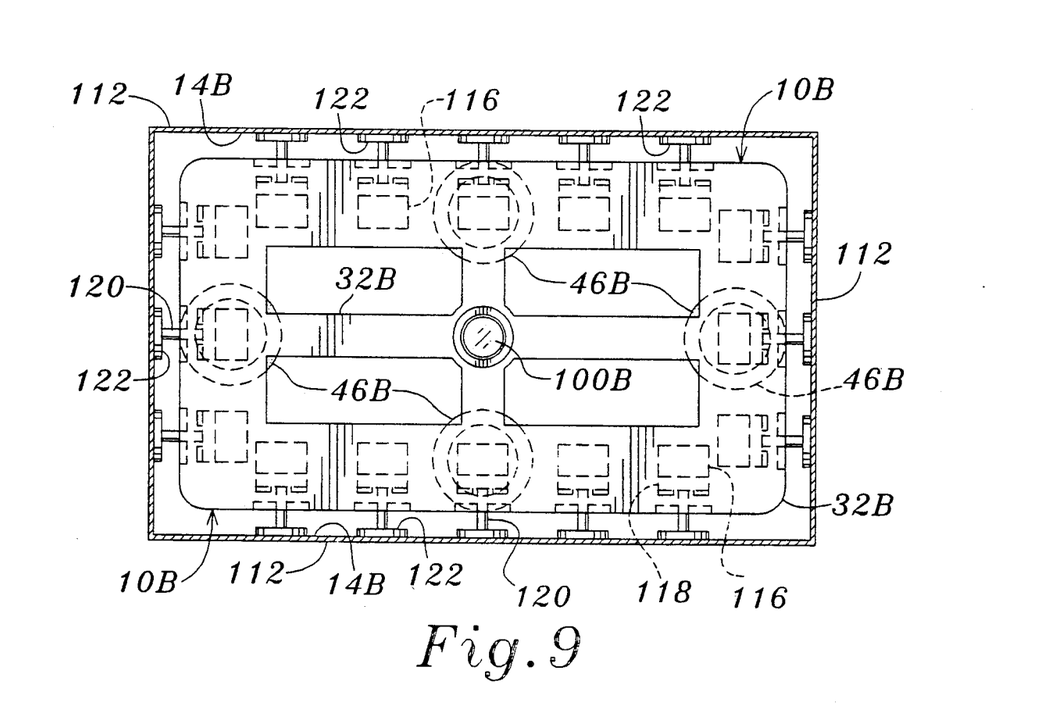
FIG. 9 illustrates a front elevation view of a further alternate embodiment of the robotic vehicle of the present invention.
Figure 10:
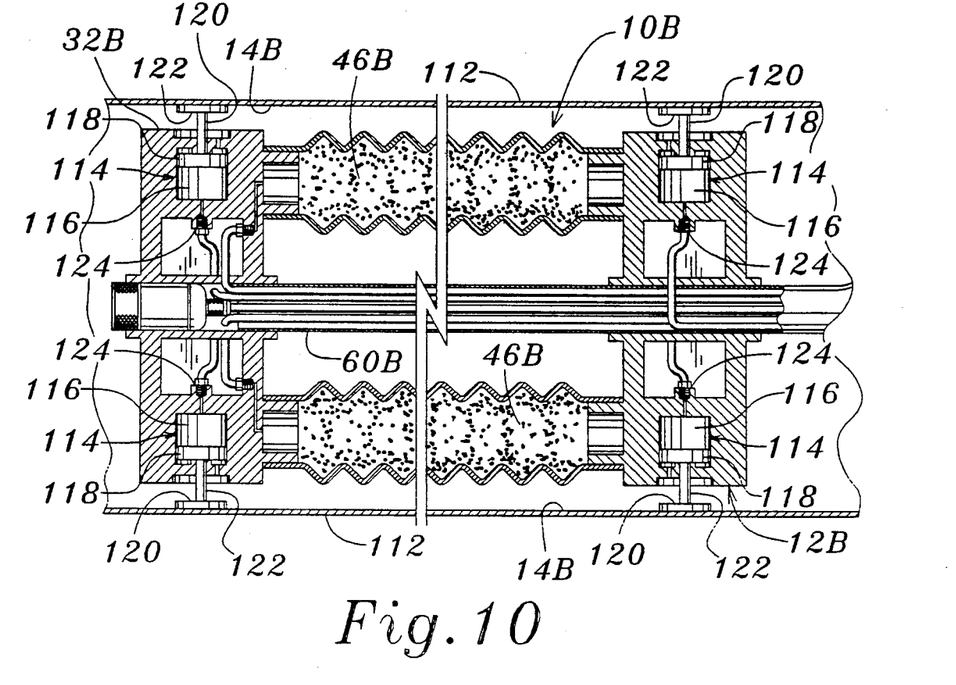
FIG. 10 illustrates a side elevation view of the alternate embodiment of the robotic vehicle of the present invention which is illustrated in FIG. 9.

In FIGS. 9 and 10 a further alternate embodiment of the robotic vehicle of the present invention is illustrated at 10B. The robotic vehicle 10B is adapted for travel within conduits having rectilinear walls, such as the illustrated conduit 112. The rear housing 12B and the forward housing 32B of the vehicle 10B define rectilinear perimeters so as to be received in the conduit 112; and, whereas the housings 12B and 32B can be provided with inflatable bladders which surround such perimeters, the illustrated vehicle 10B is provided with alternate surface engaging means.

In this regard, the surface engaging means of the housings 12B and 32B include at least one, and preferably a plurality of outwardly disposed pneumatic actuators 114 positioned on each side of the housings. In the illustrated embodiment each of the actuators 114 includes an actuator cavity 116 defined in the respective housing 12B or 32B, and a reciprocating piston member 118 disposed within the cavity 116. Each of the piston members carries an actuator arm 120 which extends out of the respective housing and which carries a foot member 122 on its outboard end for engaging the walls 14B of the conduit 112.

The actuator cavities 116 are place in fluid communication with a pressurized gas source and a vacuum source via an access port 124. Accordingly, by selectively injecting a gas into the cavities 116 the piston members 118 can be moved outwardly so as to extend the actuator arms 120 and the associated foot members 122 to engage the walls 14B of the conduit 112. Further, by selectively applying a vacuum to the cavities 116 the piston members 118 and actuator arms 120 can be retracted to allow the associated housing 12B or 32B to move within the conduit.

Figure 11:
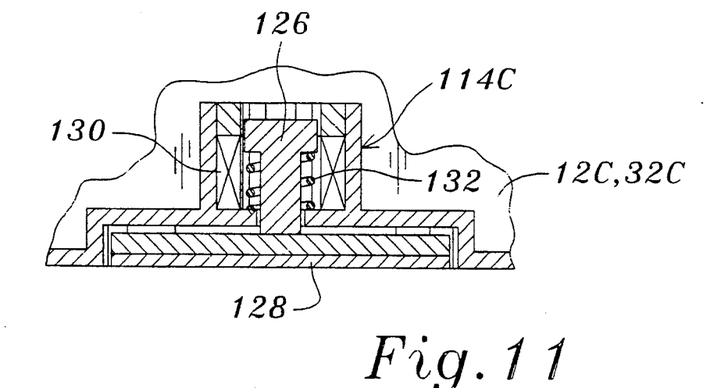
FIG. 11 illustrates a side elevation view, in section, of an alternate surface engaging means of the robotic vehicle of the present invention.

It will also be appreciated that the surface engaging means of the present invention need not be pneumatically actuated, and it is contemplated that other suitable actuators can be used. For example, a plurality of electromagnetic actuators can be used if desired. In this regard, in FIG. 11 a suitable electromagnetic actuator 114C is illustrated. The actuator 114C includes a reciprocating actuator stem 126 at least a portion of which is fabricated of a magnetic material and which carries a foot member 128 for releasably engaging the wall of a conduit. An electrically conductive coil 130 circumscribes the actuator stem 126, and when the coil 130 is electrically energized the stem 126 and foot member 128 are forced outwardly to engage the adjacent conduit wall to facilitate securing the position of the housing 12C, 32C within the conduit. Upon de-energization of the coil 130, a spring 132 typically serves to move the stem 126 and foot member 128 to their retracted position.

In light of the above it will be recognized that the present invention provides robotic vehicle having great advantages over the prior art. The robotic vehicle of the present invention can carry various monitors, tool or other devices into an enclosed conduit, and its great maneuverability allows it to travel between intersecting conduits and otherwise negotiate complex conduit systems.

While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. A robotic vehicle for travel through a conduit, said robotic vehicle comprising:
    a forward housing provided with surface engaging means for selectively engaging at least one wall of said conduit, whereby said forward housing is selectively held in a stationary position within said conduit by said surface engaging means;
    a rear housing provided with surface engaging means for selectively engaging at least one wall of said conduit, whereby said rear housing is selectively held in a stationary position within said conduit by said surface engaging means;
    at least three selectively extendable members, each said extendable member defining a cavity therein and defining a forward end portion secured to said forward housing and a rear end portion secured to said rear housing; and
    means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

2. The robotic vehicle of claim 1 wherein each said extendable member comprises a tubular bellows member.

3. The robotic vehicle of claim 1 wherein said surface engaging means of said forward housing includes at least one expandable bladder defining an internal cavity, said expandable bladder being expandable upon the injection of gas into said cavity of said expandable bladder whereby said expandable bladder selectively engages walls of said conduit, and wherein said surface engaging means of said rear housing includes at least one further expandable bladder defining an internal cavity, said further expandable bladder being expandable upon the injection of gas into said cavity of said further expandable bladder whereby said further expandable bladder selectively engages said walls of said conduit.

4. The robotic vehicle of claim 2 wherein said surface engaging means of said forward housing includes at least one expandable bladder defining an internal cavity, said expandable bladder being expandable upon the injection of gas into said cavity of said expandable bladder whereby said expandable bladder selectively engages walls of said conduit, and wherein said surface engaging means of said rear housing includes at least one further expandable bladder defining an internal cavity, said further expandable bladder being expandable upon the injection of gas into said cavity of said further expandable bladder whereby said further expandable bladder selectively engages said walls of said conduit.

5. The robotic vehicle of claim 1 wherein said surface engaging means of said forward housing includes a plurality of pneumatic actuators, each said pneumatic actuator having a reciprocating actuator arm for selectively engaging walls of said conduit whereby said pneumatic actuators selectively hold said forward housing in a stationary position within said conduit, and wherein said surface engaging means of said rear housing includes a plurality of further pneumatic actuators, each said further pneumatic actuator having a reciprocating actuator arm for selectively engaging said walls of said conduit whereby said further pneumatic actuators selectively hold said rear housing in a stationary position within said conduit.

6. The robotic vehicle of claim 1 wherein said surface engaging means of said forward housing includes a plurality of electromagnetic actuators, each said electromagnetic actuator having a reciprocating actuator stem for selectively engaging walls of said conduit whereby said actuator stems of said electromagnetic actuators selectively hold said forward housing in a stationary position within said conduit, and wherein said surface engaging means of said rear housing includes a plurality of further electromagnetic actuators, each said further electromagnetic actuator having a reciprocating actuator stem for selectively engaging said walls of said conduit whereby said actuator stems of said further electromagnetic actuators selectively hold said rear housing in a stationary position within said conduit.

7. The robotic vehicle of claim 1 wherein said forward housing includes an inner portion surrounded by a removable outer rim, said outer rim of said forward housing carrying said surface engaging means, and wherein said rear housing includes an inner portion surrounded by a removable outer rim, said outer rim of said rear housing carrying said surface engaging means, whereby said outer rims of said forward housing and said rear housing are replaceable.

8. The robotic vehicle of claim 1 wherein said forward housing is provided with means for rotating said forward housing within said conduit.

9. The robotic vehicle of claim 1 wherein said forward housing and said rear housing are provided with wheel members for rotatably engaging the walls of said conduit to facilitate travel of said forward housing and said rear housing through said conduit when said surface engaging means of said forward housing and said rear housing are not engaging said walls of said conduit.

10. A robotic vehicle for travel through a conduit, said robotic vehicle comprising:

a forward housing provided with surface engaging means for selectively engaging at least one wall of said conduit, whereby said forward housing is selectively held in a stationary position within said conduit by said surface engaging means, said surface engaging means including an expandable bladder surrounding the perimeter of said forward housing and defining an internal cavity;

a rear housing provided with surface engaging means for selectively engaging at least one wall of said conduit, whereby said rear housing is selectively held in a stationary position within said conduit by said surface engaging means, said surface engaging means including an expandable bladder surrounding the perimeter of said rear housing and defining an internal cavity;

at least three selectively extendable tubular bellows members, each said tubular bellows member defining a cavity therein and defining a forward end portion secured to said forward housing and a rear end portion secured to said rear housing;

pressurizing means for selectively pressurizing gas into the cavity of a selected one of said expandable bladders so as to expand said one of said expandable bladders, whereby said one of said expandable bladders selectively engages walls of said conduit, and for selectively pressurizing gas into the cavity of a select one of said tubular bellows members for extending said one of said tubular bellows members and increasing the distance between said forward end portion of said one of said tubular bellows members and said rear end portion of said one of said tubular bellows members;

evacuating means for selectively evacuating gas from the cavity of a selected one of said tubular bellows members for retracting said one of said tubular bellows members and decreasing the distance between said forward end portion of said one of said tubular bellows members and said rear end portion of said one of said tubular bellows members; and umbilical cable means for connecting said cavities of said expandable bladders of said forward housing and said rear housing, and said cavities of said tubular bellows members to said pressurizing means and said evacuating means.

11. The robotic vehicle of claim 10 wherein said forward housing includes an inner portion surrounded by a removable outer rim, said outer rim of said forward housing carrying said expandable bladder of said forward housing, and wherein said rear housing includes an inner portion surrounded by a removable outer rim, said outer rim of said rear housing carrying said expandable bladder of said rear housing, whereby said outer rims of said forward housing and said rear housing are replaceable.

12. The robotic vehicle of claim 10 wherein said forward housing is provided with means for rotating said forward housing within said conduit.

13. The robotic vehicle of claim 12 wherein said rear housing is provided with means for rotating said rear housing within said conduit.

14. The robotic vehicle of claim 10 wherein said forward housing and said rear housing are provided with wheel members for rotatably engaging the walls of said conduit to facilitate travel of said forward housing and said rear housing through said conduit when said expandable bladders of said forward housing and said rear housing are not engaging said walls of said conduit.

15. A robotic vehicle for travel through a conduit, said robotic vehicle comprising:
- a forward housing having an inner portion surrounded by a removable outer rim, said outer rim of said forward housing being provided with surface engaging means for selectively engaging at least one wall of said conduit, whereby said forward housing is selectively held in a stationary position within said conduit by said surface engaging means;
- a rear housing having an inner portion surrounded by a removable outer rim, said outer rim of said rear housing being provided with surface engaging means for selectively engaging at least one wall of said conduit, whereby said rear housing is selectively held in a stationary position within said conduit by said surface engaging means;
- at least three selectively extendable members, each said extendable member defining a cavity therein and defining a forward end portion secured to said forward housing and a rear end portion secured to said rear housing; and
- means for selectively pressurizing gas into the cavity of a selected one of said extendable members for extending said one of said extendable members and increasing the distance between said forward end portion of said one of said extendable members and said rear end portion of said one of said extendable members, and for selectively evacuating gas from the cavity of a selected one of said extendable members for retracting said one of said extendable members and decreasing the distance between said forward end portion of said one of said extendable members and said rear end portion of said one of said extendable members.

16. A robotic vehicle for travel through a conduit, said robotic vehicle comprising:
- a forward housing provided with surface engaging means for selectively engaging at least one wall of said conduit, whereby said forward housing is selectively held in a stationary position within said conduit by said surface engaging means, said forward housing being provided with means for rotating said forward housing within said conduit;
- a rear housing provided with surface engaging means for selectively engaging at least one wall of said conduit, whereby said rear housing is selectively held in a stationary position within said conduit by said surface engaging means;
- at least three selectively extendable members, each said extendable member defining a cavity therein and defining a forward end portion secured to said forward housing and a rear end portion secured to said rear housing; and
- means for selectively pressurizing gas into the cavity of a selected one of said extendable members for extending said one of said extendable members and increasing the distance between said forward end portion of said one of said extendable members and said rear end portion of said one of said extendable members, and for selectively evacuating gas from the cavity of a selected one of said extendable members for retracting said one of said extendable members and decreasing the distance between said forward end portion of said one of said extendable members and said rear portion of said one of said extendable members.

17. A robotic vehicle for travel through a conduit, said robotic vehicle comprising:
- a forward housing having an inner portion surrounded by a removable outer rim, said outer rim of said forward housing being provided with surface engaging means for selectively engaging at least one wall of said conduit, whereby said forward housing is selectively held in a stationary position within said conduit by said surface engaging means, said surface engaging means including an expandable bladder surrounding the perimeter of said forward housing and defining an internal cavity;
- a rear housing having an inner portion surrounded by a removable outer rim, said outer rim of said rear housing being provided with surface engaging means for selectively engaging at least one wall of said conduit, whereby said rear housing is selectively held in a stationary position within said conduit by said surface engaging means, said surface engaging means including an expandable bladder surrounding the perimeter of said rear housing and defining an internal cavity;
- at least three selectively extendable tubular bellows members, each said tubular bellows member defining a cavity therein and defining a forward end portion secured to said forward housing and a rear end portion secured to said rear housing;
- pressurizing means for selectively pressurizing gas into said cavity of a selected one of said expandable bladders so as to expand said one of said expandable bladders, whereby said one of said expandable bladders selectively engage walls of said conduit, and for selectively pressurizing gas into the cavity of a select one of said tubular bellows members for extending said one of said tubular bellows members and increasing the distance between said forward end portion of said one of said tubular bellows members and said rear end portion of said one of said tubular bellows members;
- vacuum means for selectively evacuating gas from the cavity of a selected one of said tubular bellows members for retracting said one of said tubular bellows members and decreasing the distance between said forward end portion of said one of said tubular bellows members and said rear end portion of said one of said tubular bellows members; and
- umbilical cable means for connecting said cavities of said expandable bladders of said forward housing and said rear housing, and said cavities of said tubular bellows members to said pressurizing means and said vacuum means.

18. A robotic vehicle for travel through a conduit, said robotic vehicle comprising:
- a forward housing provided with surface engaging means for selectively engaging at least one wall of said conduit, whereby said forward housing is selectively held in a stationary position within said conduit by said surface engaging means, said surface engaging means including an expandable bladder surrounding the perimeter of said forward housing and defining an internal cavity, said forward housing being provided with means for rotating said forward housing within said conduit;
- a rear housing with surface engaging means for selectively engaging at least one wall of said conduit, whereby said rear housing is selectively held in a stationary position within said conduit by said surface engaging means, said surface engaging means including an expandable bladder surrounding the perimeter of said rear housing and defining an internal cavity;

at least three selectively extendable tubular bellows members, each said tubular bellows member defined a cavity therein and defining a forward end portion secured to said forward housing and a rear end portion secured to said rear housing;

pressurizing means for selectively pressurizing gas into said cavity of a selected one of said expandable bladders so as to expand said one of said expandable bladders, whereby said one of said expandable bladders selectively engage walls of said conduit, and for selectively pressurizing gas into said cavity of a select one of said tubular bellows members for extending said one of said tubular bellows members and increasing the distance between said forward end portion of said one of said tubular bellows members and said rear end portion of said one of said tubular bellows members;

vacuum means for selectively evacuating gas from said cavity of a selected one of said tubular bellows members for retracting said one of said tubular bellows members and decreasing the distance between said forward end portion of said one of said tubular bellows members and said rear end portion of said one of said tubular bellows members; and umbilical cable means for connecting said cavities of said expandable bladders of said forward housing and said rear housing, and said cavities of said tubular bellows members to said pressurizing means and said vacuum means.

19. The robotic vehicle of claim 18 wherein said rear housing is provided with means for rotating said rear housing within said conduit.

20. The robotic vehicle of claim 18 wherein said means for rotating said forward housing within said conduit includes at least one pneumatic actuator having oppositely disposed actuator arms for being selectively reciprocated to engage said walls of said conduit whereby said forward housing is selectively rotated within said conduit by said actuator arms.

21. The robotic vehicle of claim 19 wherein said means for rotating said forward housing within said conduit includes at least one pneumatic actuator having oppositely disposed actuator arms for being selectively reciprocated to engage said walls of said conduit whereby said forward housing is selectively rotated within said conduit by said actuator arms, and wherein said means for rotating said rear housing within said conduit includes at least one pneumatic actuator having oppositely disposed actuator arms for being selectively reciprocated to engage said walls of said conduit whereby said forward housing is selectively rotated within said conduit by said actuator arms.

22. A robotic vehicle for travel through a conduit, said robotic vehicle comprising:

a forward housing provided with a surface engaging mechanism for selectively engaging at least one wall of said conduit, whereby said forward housing is selectively held in stationary position within said conduit by said surface engaging mechanism;

a rear housing provided with a surface engaging mechanism for selectively engaging at least one wall of said conduit, whereby said rear housing is selectively held in a stationary position within said conduit by said surface engaging mechanism;

at least three selectively extendable members, each said extendable member defining a cavity therein and defining a forward end portion secured to said forward housing and a rear end portion secured to said rear housing, each said extendable member being axially extendable and laterally bendable;

a pump mechanism for selectively pressurizing gas into said cavity of a selected one of said extendable members for axially extending said one of said extendable members and increasing the distance between said forward end portion of said one of said extendable members and said rear end portion of said one of said extendable members; and a vacuum mechanism for selectively evacuating gas from said cavity of a selected one of said extendable members for axially retracting said one of said extendable members and decreasing the distance between said forward end portion of said one of said extendable members and said rear end portion of said one of said extendable members.

23. A robotic vehicle comprising:

a forward housing provided with surface engaging means for selectively engaging a supporting surface, whereby said forward housing is selectively held in a stationary position with respect to said supporting surface by said surface engaging means;

a rear housing provided with surface engaging means for selectively engaging a supporting surface, whereby said rear housing is selectively held in a stationary position with respect to supporting surface by said surface engaging means;

at least three selectively extendable members, each said extendable member defining a cavity therein and defining a forward end portion secured to said forward housing and a rear end portion secured to said rear housing, each said extendable member being axially extendable and laterally bendable; and means for selectively pressurizing gas into the cavity of a selected one of said extendable members for axially extending said one of said extendable members and increasing the distance between said forward end portion of said one of said extendable members and said rear end portion of said one of said extendable members, and for selectively evacuating gas from the cavity of a selected one of said extendable members for axially retracting said one of said extendable members and decreasing the distance between said forward end portion of said one of said extendable members and said rear end portion of said one of said extendable members.

* * * * *